US010656996B2

(12) United States Patent
Chang et al.

(10) Patent No.: US 10,656,996 B2
(45) Date of Patent: May 19, 2020

(54) INTEGRATED SECURITY AND DATA REDUNDANCY

(71) Applicant: PhazrIO Inc., Los Angeles, CA (US)

(72) Inventors: Donald C. D. Chang, Thousand Oaks, CA (US); Chi-Kwan Jim Cheung, Santa Monica, CA (US); Lara Dolecek, Los Angeles, CA (US); Gary N. Jin, Portland, OR (US); Rocky Chi-Ray Lin, Rowland Heights, CA (US)

(73) Assignee: PhazrIO Inc., Alhambra, CA (US)

( * ) Notice: Subject to any disclaimer, the term of this patent is extended or adjusted under 35 U.S.C. 154(b) by 196 days.

(21) Appl. No.: 15/721,329

(22) Filed: Sep. 29, 2017

(65) Prior Publication Data
US 2018/0173589 A1    Jun. 21, 2018

Related U.S. Application Data

(60) Provisional application No. 62/437,479, filed on Dec. 21, 2016.

(51) Int. Cl.
*G06F 11/00* (2006.01)
*G06F 11/10* (2006.01)
(Continued)

(52) U.S. Cl.
CPC .......... *G06F 11/1076* (2013.01); *G06F 21/14* (2013.01); *G06F 21/6218* (2013.01);
(Continued)

(58) Field of Classification Search
None
See application file for complete search history.

(56) References Cited

U.S. PATENT DOCUMENTS 4,336,612 A * 6/1982 Inoue ................. G11B 20/1813
714/755
9,158,927 B1 * 10/2015 Franklin ............... G06F 21/602
(Continued)

FOREIGN PATENT DOCUMENTS

CN        105322973 A     2/2016

OTHER PUBLICATIONS

M. Schnjakin, T. Metzke and C. Meinel, "Applying Erasure Codes for Fault Tolerance in Cloud-RAID," 2013 IEEE 16th International Conference on Computational Science and Engineering, Sydney, NSW, 2013, pp. 66-75.doi: 10.1109/CSE.2013.20 (Year: 2013).*
(Continued)

*Primary Examiner* — Daniel F. McMahon
(74) *Attorney, Agent, or Firm* — Shun Yao; Park, Vaughan, Fleming & Dowler LLP

(57) ABSTRACT

One embodiment provides a system that facilitates integrated security and high availability. During operation, the system obtains a number of data elements from a data stream based on a number of coded fragments that a code word includes. The system determines one or more bit-level operations for the data elements in such a way that at least one of the one or more bit-level operations becomes eliminated from a process of erasure encoding. The system then obfuscates the data elements based on one or more bit-level operations. Subsequently, the system generates a code word of the erasure encoding from the obfuscated data elements based on the generator matrix. The code word comprises a plurality of coded fragments.

20 Claims, 14 Drawing Sheets

(51) Int. Cl.
*H04L 1/00* (2006.01)
*G06F 21/14* (2013.01)
*H03M 13/15* (2006.01)
*G06F 21/62* (2013.01)
*H04L 9/06* (2006.01)
*H03M 13/13* (2006.01)
*H03M 13/37* (2006.01)

(52) U.S. Cl.
CPC ......... *H03M 13/13* (2013.01); *H03M 13/154* (2013.01); *H03M 13/373* (2013.01); *H04L 1/0058* (2013.01); *H04L 9/065* (2013.01); *G06F 2221/031* (2013.01); *G06F 2221/033* (2013.01)

(56) References Cited

U.S. PATENT DOCUMENTS

| | | | | |
|---|---|---|---|---|
| 9,489,252 | B1* | 11/2016 | Donlan | G06F 12/0238 |
| 2002/0101369 | A1* | 8/2002 | Gottesman | G10L 19/005 |
| | | | | 341/94 |
| 2011/0154155 | A1* | 6/2011 | Abu-Surra | H03M 5/145 |
| | | | | 714/756 |
| 2012/0311345 | A1* | 12/2012 | Dhuse | G06F 3/067 |
| | | | | 713/189 |
| 2013/0166988 | A1* | 6/2013 | Sharon | G06F 11/1012 |
| | | | | 714/758 |
| 2013/0198582 | A1* | 8/2013 | Stauffer | H03M 13/2906 |
| | | | | 714/755 |
| 2014/0279104 | A1 | 9/2014 | Grube et al. | |
| 2016/0026543 | A1 | 1/2016 | Tian | |
| 2017/0164271 | A1* | 6/2017 | Natarahjan | H04W 48/16 |
| 2017/0344307 | A1* | 11/2017 | Shahidi | G06F 3/0652 |

OTHER PUBLICATIONS

"Decentralized Erasure Codes for Distributed Networked Storage." IEE/ACM Transactions on Networking (TON) 14, No. SI (2006): 2809-2816. (Retrieved from the internet) Retrieved on Mar. 19, 2018: <http://citeseerx.ist.psu.edu/viewdoc/download?doi=10.1.1.89.8635&rep=rep1&type=pdf> Dimakis, Ag G. et al., Jun. 1, 2006, section II. Model and Code Construction—A. Model Assumptions, B. Decentralized Erasure Codes p. 2, line 43—p. 3, end of section B.

* cited by examiner

INTEGRATED SECURITY AND DATA REDUNDANCY

RELATED APPLICATIONS

This application claims the benefit of U.S. Provisional Application No. 62/437,479, titled "Method for Efficient Enhancement of Data Security in Erasure Coded System," by inventors Donald C. D. Chang, Chi Kwan Jim Cheung, Lara Dolecek, Gary N. Jin, and Rocky Chi-Ray Lin, filed 21 Dec. 2016, the disclosure of which is incorporated by reference herein.

The present disclosure is related to U.S. patent application Ser. No. 15/499,664, titled "High Performance Redundancy and Fault Tolerance," by inventors Donald C. D. Chang, Chi Kwan Jim Cheung, Lara Dolecek, Gary N. Jin, and Rocky Chi-Ray Lin, filed 27 Apr. 2017, the disclosure of which is incorporated by reference herein.

BACKGROUND

Field

This disclosure is generally related to secured data redundancy. More specifically, this disclosure is related to a method and system for facilitating integrated security and data redundancy based on erasure-coding.

Related Art

With the advancement of the computer and network technologies, various operations performed by users of different applications have led to extensive use of web services. This proliferation of the Internet and Internet-based user activity continues to create a vast amount of digital data. For example, users may both generate and access data via different applications, such as mobile applications running on different platforms, as well as web-interfaces running on different browsers in different operating systems. For example, users can create documents that may need secured access from different devices.

To ensure safety and security, typically multiple obfuscated copies of such data are stored in the cloud (e.g., in a large storage system in a data center). For example, a large storage system relies on the obfuscated data and making at least three obfuscated copies of the data in separate physical locations (e.g., in separate physical devices). This process of encryption and replication ensures security and high availability. To improve storage efficiency and reliability, high availability to data is often provided using erasure coding. Storage systems based on erasure coding (which can be referred to as erasure-coded systems) can provide higher tolerances of failure incidents than typical replication-based techniques while using less storage. Erasure codes, such as Reed-Solomon codes, are commonly used today in large storage systems for improved performance.

To ensure security, the data is typically obfuscated based on one or more operations (e.g., bit shifting, byte substitution, key combination, etc.). Such obfuscation operations are computationally intensive. In addition, a vast majority of the erasure codes in commercial use are implemented as sets of linear equations using Galois fields. Galois field arithmetic is computationally complex and may take longer to compute than simple numerical operations. This complexity increases the computational complexity of data management, leading to reduction of throughput of the storage systems.

Although obfuscation and erasure coding is available for efficient storage, some problems still remain in the deployment of integrated security and erasure coding for data streams.

SUMMARY

One embodiment provides a system that facilitates integrated security and high availability. During operation, the system obtains a number of data elements from a data stream, which can be a single data stream or one of a number of parallel data streams, based on a number of coded fragments that a code word includes. The system determines one or more bit-level operations for the data elements in such a way that at least one of the one or more bit-level operations becomes eliminated from a process of erasure encoding. The system then obfuscates the data elements based on one or more bit-level operations. Subsequently, the system generates a code word of the erasure encoding from the obfuscated data elements based on the generator matrix. The code word comprises a plurality of coded fragments. It should be noted that the system can apply these operations in parallel to each of the parallel data streams to generate corresponding coded fragments.

In a variation on this embodiment, the number of data elements can include a first and a second data elements. The first data element includes a first set of bytes from a first data stream, and the second data element includes a second set of bytes from the first data stream.

In a variation on this embodiment, the number of data elements can include a first and a second data elements. The first data element includes a first set of bytes from a first data stream, and the second data element includes a second set of bytes from a second data stream. The first and second data streams can be parallel data streams.

In a variation on this embodiment, the bit-level operations include one or more of: a bit shift operation, an exclusive OR (XOR) operation, and a byte substitution/replacement operation.

In a further variation, the XOR operation is between the data elements and a binary obfuscation matrix. The binary obfuscation matrix is organized to incorporate security bits into the data elements.

In a further variation, the system determines an obfuscation configuration, which specifies one or more of: the XOR operation, the bit shift operation, and the byte substitution/replacement operation.

In a variation on this embodiment, the data elements are represented in a numerical representation. The numerical representation and the generator matrix include one or more complex numbers in a format composed of real and imaginary parts.

In a further variation, prior to obfuscating the data elements, the system allocates a number of padding bits, which are not from the data stream, to a respective data element for overflow.

In a variation on this embodiment, the system determines one or more bit-level operations by determining a set of bit-level operations that share common properties with obfuscation and erasure encoding and selecting the one or more bit-level operations from the set of bit-level operations.

In a variation on this embodiment, the system retrieves a minimum number of coded fragments of the code word needed to recover the data elements and applies an inverse of the one or more bit-level operations to the coded fragments to remove the obfuscation. The system then obtains the data elements from the coded fragments based on an inverted matrix of a sub-matrix of the generator matrix based on the minimum number of the coded fragments.

In a variation on this embodiment, the system identifies one or more of the coded fragments that are unavailable and identifies remaining coded fragments that are available. The system then determines a sub-matrix of the generator matrix based on a minimum number of the remaining coded fragments needed to recover the unavailable coded fragments. Subsequently, the system recovers, at the same time, all of the unavailable coded fragments based on an inverted matrix of the sub-matrix and indices of the unavailable coded fragments, thereby avoiding recovery of one unavailable coded fragment at a time.

BRIEF DESCRIPTION OF THE FIGURES

In the figures, like reference numerals refer to the same figure elements.

DETAILED DESCRIPTION

Figure 1A:
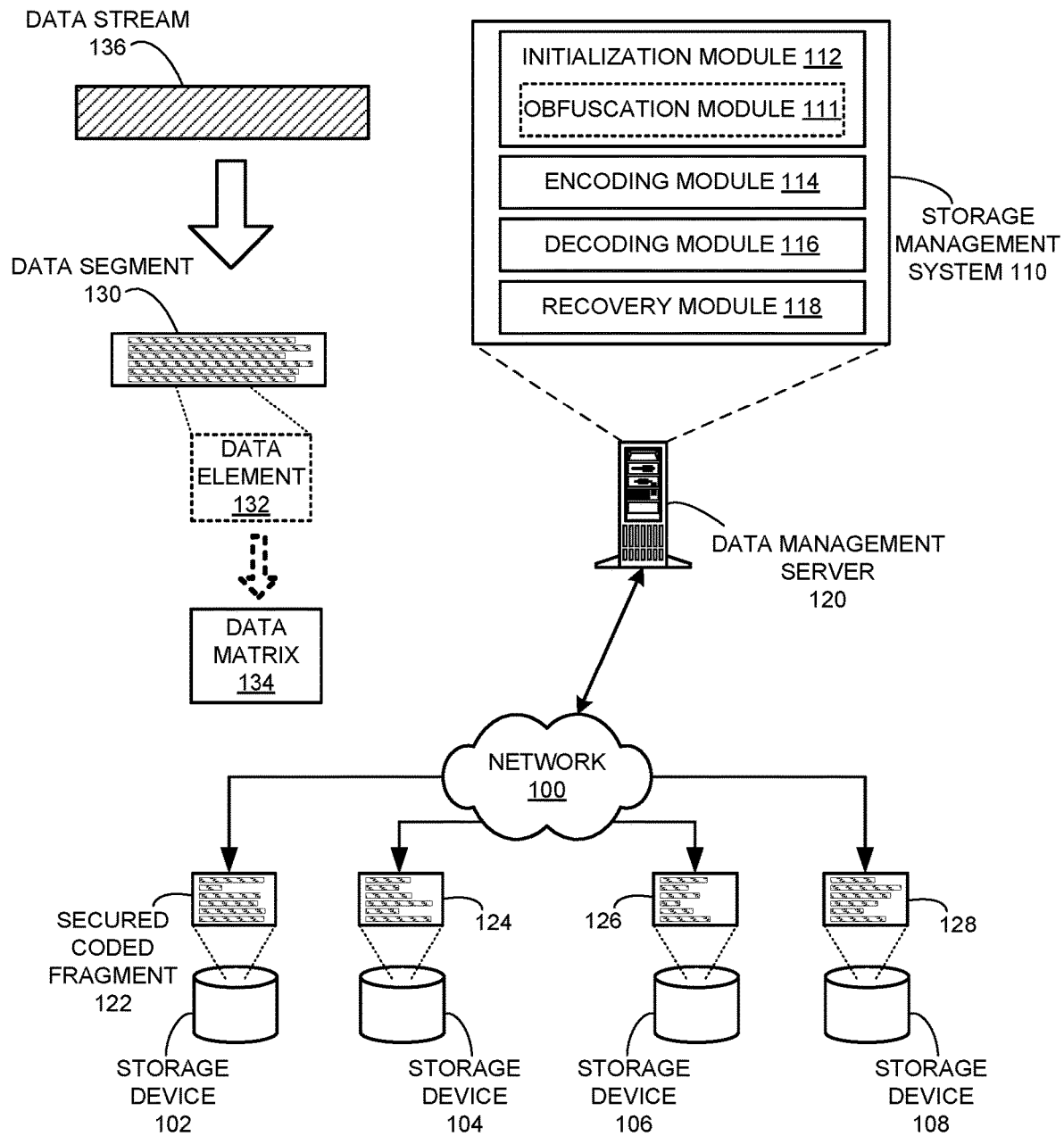
FIG. 1A illustrates an exemplary storage management system with integrated security and erasure-coding support, in accordance with an embodiment described herein.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the problem of integrating security and high availability in an efficient way by performing integrated data obfuscation and numerical operation-based erasure coding to facilitate secured high availability to data streams. Due to ease of access via the Internet, a large number of users generate and access digital data. To ensure secured high availability of data, typically the data is obfuscated and multiple copies of the obfuscated data are stored in a storage system. If one copy of the data becomes unavailable (e.g., the storage device storing the copy fails), the system can still provide the data to the user from another copy of the data.

With existing technologies, erasure coding can be used to provide high availability with a lower storage requirement than typical replication-based techniques. Erasure coding performs encoding on the data to generate a number of coded fragments. A subset of the coded fragments can be used to retrieve the original data. As a result, even if one or more of the coded fragments becomes unavailable, the system can retrieve the original data. For example, in a (6,4) erasure-coding-based storage system, the original data is encoded into 6 coded fragments. The system can use any 4 of the coded fragments to retrieve the original data.

However, data encoded using off-the-shelf erasure coding can be reverse engineered and deciphered, leading to lack of data privacy. For example, certain patterns in the erasure coding may expose the original data. Furthermore, with this erasure coding, due to a encoding mechanism, certain patterns are excluded in the encoding. As a result, the possible search-space while attempting to decipher the original data becomes reduced, which increases the likelihood of deducing the generator matrix used for the erasure coding.

On the other hand, to enhance the security, additional encryption techniques are applied to the data. Existing solutions perform data transformation for security (e.g., XOR operation, bit shifting, byte substitution/replacement, industry standard encryption, etc.) and data transformation for fault tolerance (i.e., erasure coding) as discrete steps. For example, the data can first be encrypted using an encryption mechanism. Erasure coding can then be used for generating coded fragments of the encrypted data. However, encryption requires complex key management schemes that cause additional computation. As a result, deploying encryption and erasure coding as discrete steps has limited usability and may not be suitable for data stream use cases (which can be referred to as live or hot data). Even when such a deployment is used for archival purposes (which can be referred to as cold data), the overall capital and operational expenses of the deployment can be significant.

To solve this problem, embodiments described herein provide a storage management system that integrates obfuscation operations with erasure coding operations. Conventional approaches for data privacy and security rely on matrix operations to transform plaintext to encoded ciphertext. For example, Advanced Encryption Standard (AES) uses Galois field arithmetic for the data encryption process. On the other hand, erasure coding also relies on matrix operations to transform plaintext into coded fragments for data redundancy and fault tolerance. For example, typical Reed Solomon implementations also use Galois field arithmetic.

The storage management system combines the matrix operations for security with the matrix operations of the erasure coding into a single set of matrix operations. The combined matrix operations can be performed in a single compute cycle of a computer to transform original data bits into coded fragments that provide data redundancy and security. Furthermore, the system uses hardware-accelerated processing of security and vector instruction sets for fault tolerance concurrently. Instead of using a processor-optimized encryption routine to encrypt data and then using a processor-optimized routine to perform Galois field operations for fault tolerance as discrete operations, the system integrates these operations. For example, the system allows a single execution of processor-optimized instructions for both security and fault tolerance. This results in significant speed-up of data processing.

Although the present disclosure is presented using examples based on a single data stream, the system is not limited to a single data stream. The system can apply these operations to multiple data streams in parallel. However, the present disclosure presents the operations with a single data stream for exemplifying the integration of privacy and redundancy.

Storage Management System

FIG. 1A illustrates an exemplary storage management system with integrated security and erasure-coding support, in accordance with an embodiment described herein. In this example, a data management server 120 is coupled with a network 100. Server 120 can be a physical or a virtual device. Network 100 can be a local or a wide area network, or the Internet. Network 100 can also be a data center network operating in a data center distributed across one or more geographic locations. Server 120 hosts a storage management system 110, which performs erasure coding to facilitate high availability to one or more data streams.

Erasure coding can be systematic and non-systematic. Systematic erasure codes store original data bits separately from parity bits. The data bits are in plaintext and can be accessed without decoding. The parity bits are used to recover the original data bits in an event of data corruption. On the other hand, non-systematic erasure codes combine original data and parity data as encoded bits. This provides implicit data security by avoiding data in plaintext. Non-systematic erasure codes are generally slower than systematic codes for access operations.

Server 120 can facilitate specialized hardware instructions for computing erasure codes. Examples of such instructions include, but are not limited to, Single Instruction Multiple Data (SIMD) and Advanced Vector Extensions, such as AVX, AVX2, etc. These instructions can allow server 120 to manipulate large data vectors with a smaller number of instructions and accelerate computation associated with Galois field arithmetic. However, even with such hardware support, system 110 may still operate more slowly than traditional replication-based systems. As a result, system 110 may not be suitable for data streams and may be limited to archival data.

With existing technologies, system 110 can use erasure coding to provide high availability to data segment 130 with a lower storage requirement than typical replication-based techniques. However, data encoded using off-the-shelf erasure coding can be reverse engineered and deciphered, leading to lack of data privacy. For example, certain patterns of the erasure coding may expose some parts of data segment 130. Furthermore, with this erasure coding, due to the limitations of the encoding mechanism, certain patterns are excluded in the encoding. As a result, the possible search-space while attempting to decipher data segment 130 becomes reduced, which increases the likelihood of deducing the generator matrix used for the erasure coding.

On the other hand, to enhance the security, additional encryption techniques are applied to obfuscate data segment 130. Existing solutions perform data transformation for security and data transformation for fault tolerance as discrete steps. For example, system 110 can first encrypt data segment 130 using an encryption mechanism. System 110 can use erasure coding on the encrypted data segment 130 for generating the coded fragments. However, to encrypt data segment 130, system 110 performs complex key management schemes and increases computation. As a result, system 110 deploying encryption and erasure coding as discrete steps limits usability and may not be suitable for data streams. Even when such a deployment is used for archival purposes, the overall capital and operational expenses of the deployment of system 110 can be significant.

To solve this problem, system 110 integrates obfuscation operations with erasure coding operations. System 110 may use matrix operations to transform plaintext to encoded ciphertext for providing privacy and security to data segment 130. For example, AES-based encryption techniques use Galois field arithmetic for the data encryption process. On the other hand, system 110 may also use erasure coding to transform data segment 130 into coded fragments using matrix operations. For example, typical Reed Solomon implementations also use Galois field arithmetic.

To efficiently provide both security and high availability, system 110 combines the matrix operations for security with the matrix operations of the erasure coding into a single set of matrix operations. System 110 can perform the combined matrix operations in a single compute cycle of server 120 to transform original data bits of data segment 130 into coded fragments that provide data redundancy and security. Furthermore, system 110 can use enhanced hardware instruction sets for security and fault tolerance of server 120 concurrently. For example, system 110 allows a single execution of processor-optimized instructions of server 120 for both security and fault tolerance. This results in significant speed-up of data processing in server 120.

In some embodiments, system 110 can include an initialization module 112, an encoding module 114, a decoding module 116, and a recovery module 118. To integrate obfuscation operations, initialization module 112 can further include an obfuscation module 111. Using these modules, system 110 facilitates write, read, obfuscation, and fault tolerance capabilities of a storage system using matrix operations. Furthermore, erasure code implementation using numerical types (e.g., integers, doubles, big integer, floating points, decimal floating points, etc.), instead of using a Galois field lookup table, can allow system 110 to significantly speed up the erasure coding process.

During operation, initialization module 112 determines the bit-width of the processing capacity of server 120. Based on the determination, initialization module 112 determines the number of bits in a data element. For example, if initialization module 112 determines that server 120 includes a 64-bit processor, initialization module 112 determines that a data element should include 64 bits. Since Galois field arithmetic is typically executed on 8 bits at a time, processing 64 bits at a time can significantly increase the encoding process.

Initialization module 112 obtains a data element 132 of the determined bit-length from data segment 130 of a data stream 136, which can be a single data stream or one of a number of parallel data streams, and can load data element 132 into the memory of server 120. Data bytes in data element 132 can represent real numbers, such as integers and floating points, or linear equations, such as Galois field equations. For example, if system 110 uses real numbers for representing data element 132, initialization module 112 represents data element 132 in a numerical representation. Initialization module 112 obtains a plurality of data elements from data segment 130 and forms a data matrix 134 comprising the plurality of data elements. Initialization module 112 can introduce additional bytes into data matrix 134 to optimize and facilitate the erasure coding process.

In some embodiments, obfuscation module 111 organizes data matrix 134 with XOR, shift, and substitution operations in such a way that the input data stream is obfuscated as the data is read into memory. Obfuscation module 111 can also organize data matrix 134 to reduce the number of shift operations that could be needed for the matrix operations to produce the coded fragments. These shift and substitution operations may be applicable to one or more bytes of data matrix 134 (e.g., a byte of data element 132), or single or multiple rows and/or columns of data matrix 134. System 110 can predetermine the XOR, shift, and substitution operations based on the sizes of the input data and the generator matrix, or can deterministically calculate at the runtime.

Encoding module 114 then determines a generator matrix for data matrix 134. In some embodiments, encoding module 114 multiplies data matrix 134 and the generator matrix to generate a plurality of coded fragments 122, 124, 126, and 128. A storage system can distribute coded fragments 122, 124, 126, and 128 via network 100 and store them in storage devices 102, 104, 106, and 108, respectively. It should be noted that storage devices 102, 104, 106, and 108 can be at the same location or in different geographic locations. Coded fragments 122, 124, 126, and 128 can also be stored in a same storage device. Examples of a storage device include, but are not limited to, cloud storage, a hard disk drive (HDD), a solid-state drive (SSD), and a flash memory.

Decoding module 116 can use a subset of coded fragments and a corresponding decoder matrix to retrieve the data elements. For example, if data segment 130 can be recovered from three coded fragments, decoding module 116 can use coded fragments 122, 124, and 128 to retrieve data matrix 134. Under such a scenario, the decoder matrix can correspond to the sub-matrix that has been used to generate coded fragments 122, 124, and 128, and may not include the sub-matrix that has been used to generate coded fragment 126.

Suppose that storage device 102 becomes unavailable (e.g., due to a device or a network failure). As a result, coded fragment 122 also becomes unavailable. Recovery module 118 can use the available coded fragments 124, 126, and 128 to reconstruct the unavailable coded fragment 122 based on a recovery matrix. Under such a scenario, the recovery matrix can correspond to the sub-matrix that has been used to generate coded fragments 124, 126, and 128, and may not include the sub-matrix that has been used to generate coded fragment 122. It should be noted that the decoder matrix and recovery matrix can be obtained from inversing the corresponding sub-matrix of the generator matrix.

Figure 1B:
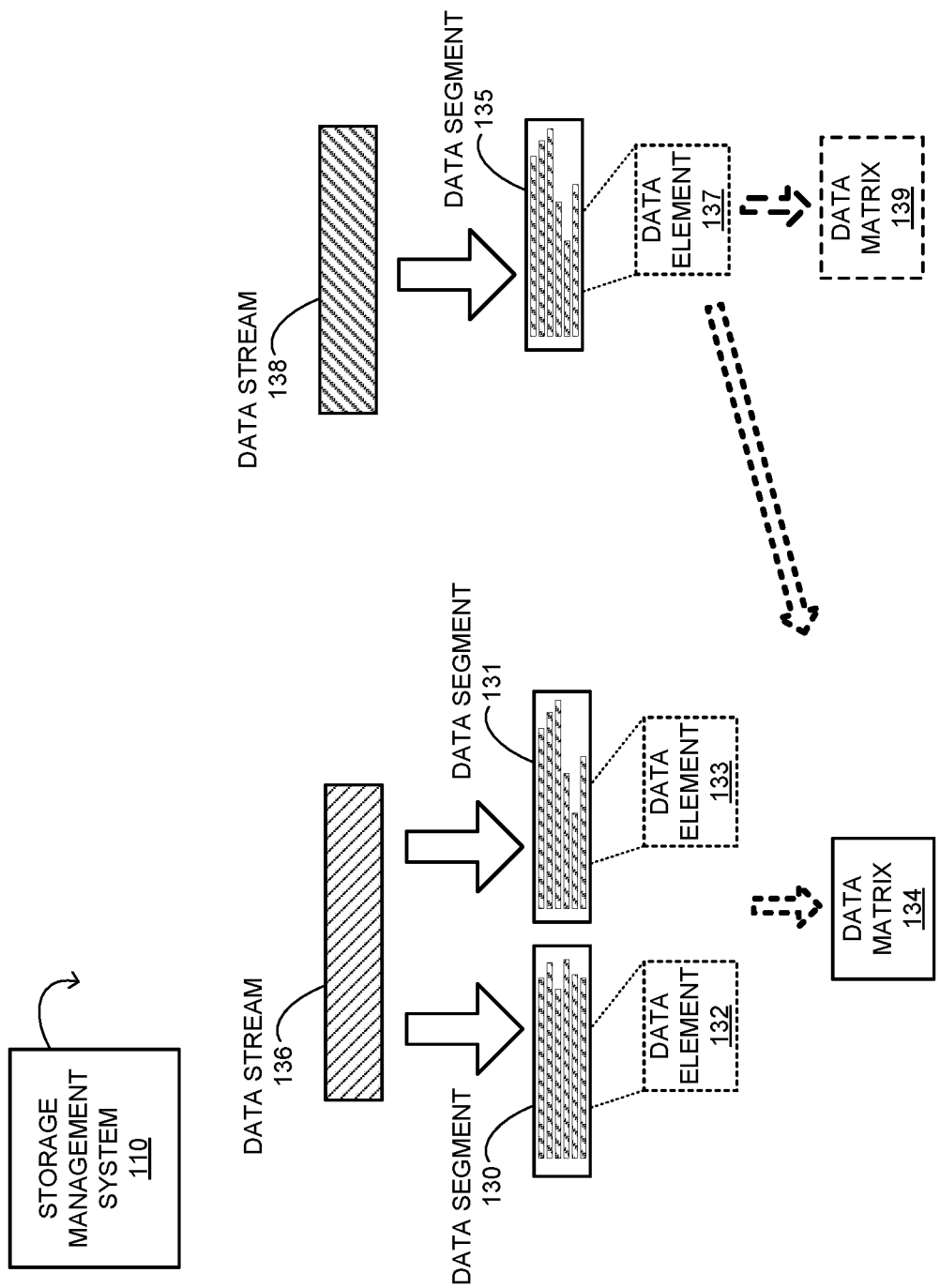
FIG. 1B illustrates exemplary parallel operations of a storage management system with integrated security and erasure-coding support, in accordance with an embodiment described herein.

FIG. 1B illustrates exemplary parallel operations of a storage management system with integrated security and erasure-coding support, in accordance with an embodiment described herein. In this example, system 110 can obtain another data segment 131 from another part of data stream 136. System 110 can obtain a data element 133 of the determined bit-length from data segment 131. Instead of obtaining a plurality of data elements from data segment 130, system 110 can obtain data elements 132 and 133 from different data segments 130 and 131, and form a data matrix 134 comprising data elements 131 and 133.

In some embodiments, system 110 can apply these operations to multiple data streams 136 and 138 in parallel. For example, while system 110 is generating data matrix 134, system 110 can, in parallel, obtain a data element 137 of the determined bit-length from data segment 135 of data stream 138. System 110 can obtain a plurality of such data elements from data segment 135 and form a data matrix 139 comprising the data elements. In this way, system 110 can apply these operations in parallel to each of parallel data streams 136 and 138 to generate corresponding coded fragments. System 110 can also combine data elements 132 and 133 of data stream 136, and data element 137 of data stream 138 to generate data matrix 134, thereby processing data from multiple data streams to generate a set of coded fragments.

Integrated Security and Erasure Coding

Figure 1C:
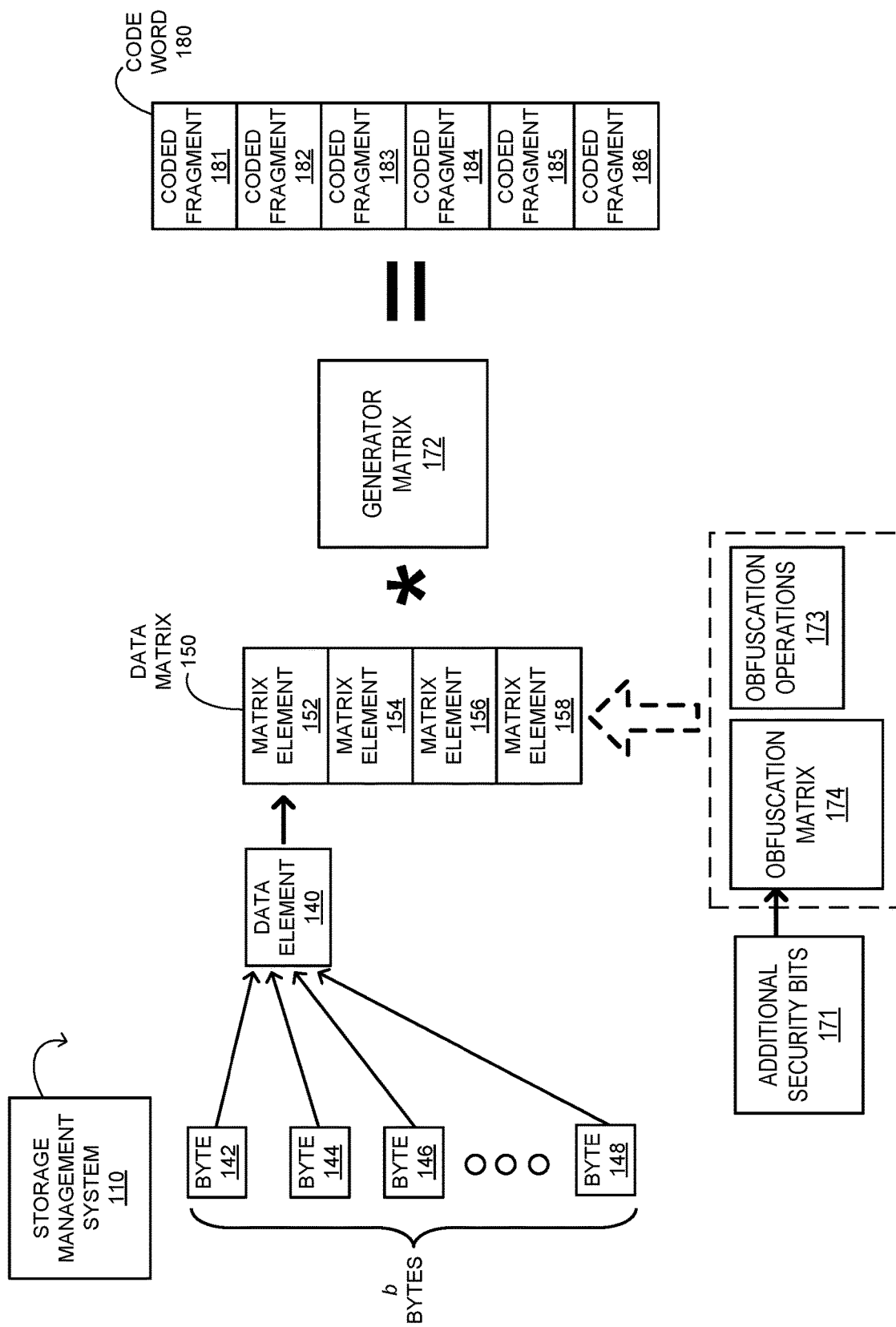
FIG. 1C illustrates an exemplary integration of security bits with erasure coding, in accordance with an embodiment described herein.

FIG. 1C illustrates an exemplary integration of security bits with erasure coding, in accordance with an embodiment described herein. During operation, system 110 determines how many bits a data element should include. For example, if a computing device includes a 64-bit processor and/or includes a 64-bit bus, the system can determine to include 64 bits or 8 bytes in a data element. In this example, the system includes b bytes, comprising bytes 142, 144, 146, and 148, from a data stream in data element 140.

System 110 can transform data element 140 to a matrix element 152 by representing the bytes in data element 140 in real numbers, such as integers and floating points, or as linear equations, such as Galois field equations. Matrix element 152 may include additional bytes than data element 140 to optimize and facilitate the erasure coding process. In the same way, system 110 generates matrix elements 154, 156, and 158. System 110 then forms a data matrix 150 comprising matrix elements 152, 154, 156, and 158.

System 110 can combine additional security bits 171 with data matrix 150. Additional security bits 171 can include, but are not limited to, encryption keys generated by system 110 or user-defined encryption keys. System 110 may use an obfuscation matrix 174 to inject additional security bits 171. System 110 can use existing methods of encryption key management based on any industry standard to manage additional security bits 171.

System 110 then determines a generator matrix 172 based on the size of data matrix 150 and the number of coded fragments to be generated. In some embodiments, the number of matrix elements in data matrix 150 can be determined by the dimension of generator matrix 172 such that data matrix 150 and generator matrix 172 can be multiplied. For example, if the number of coded fragments to be generated is six and the minimum number of coded fragments needed to recover the data elements is four, generator matrix 172 should be a 4-by-6 matrix. Under such circumstances, data matrix 150 should be a 1-by-4 matrix.

System 110 then multiplies data matrix 150 and generator matrix 172 to generate code word 180, which includes coded fragments 181, 182, 183, 184, 185, and 186. The system may use a subset of these coded fragments to recover the original data. It should be noted that obfuscation matrix 174 can share common properties with generator matrix 172. These shared matrix properties can reduce repeated matrix computation and lookup operations in matrices 172 and 174. Obfuscation matrix 174 may include elements from Galois field lookup tables commonly used in AES encryption implementations and erasure coding. Obfuscation matrix 174 can also include common binary matrices. In some embodiments, system 110 also applies a number of obfuscation operations 173, which include a combination of shift and substitution operations and matrix operations, to data matrix 150. Obfuscation operations 173 can further reduce duplicate bitwise and linear arithmetic operations that may be needed to multiply data matrix 150 and generator matrix 172.

Figure 1D:
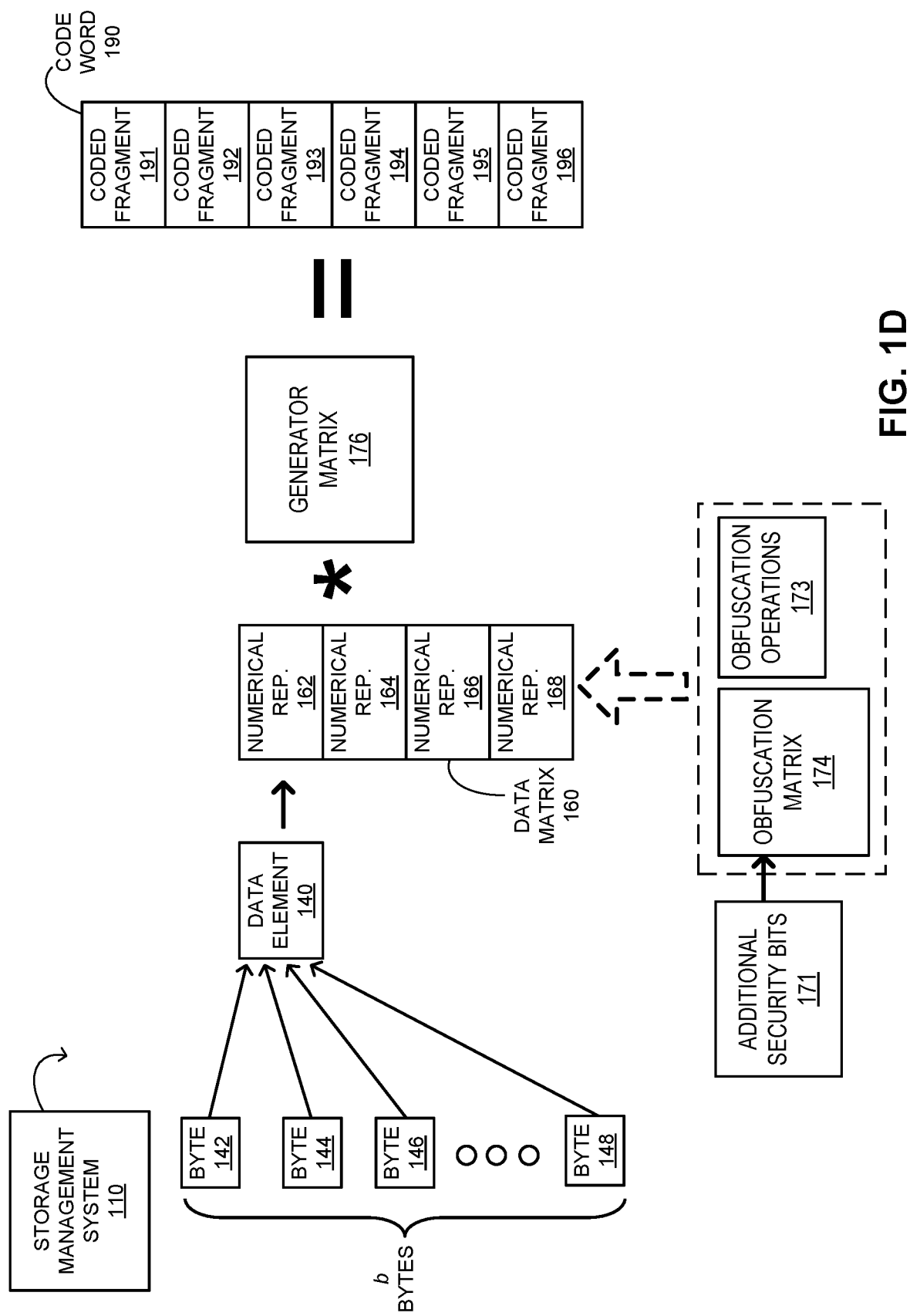
FIG. 1D illustrates exemplary integrated obfuscation and numerical operation-based erasure coding, in accordance with an embodiment described herein.

FIG. 1D illustrates exemplary integrated obfuscation and numerical operation-based erasure coding, in accordance with an embodiment described herein. In this example, system 110 represents data element 140 in a numerical representation 162. For example, system 110 can convert the bits of data element 140 into a numerical data type. Such numerical data types can be a real number, an imaginary number, or a combination of real and imaginary numbers. In some embodiments, system 110 allocates a subset of bits of data element 140 as a set of padding bits to incorporate an overflow, if any, for the numerical operations performed on numerical representation 162. System 110 can determine an optimal number of padding bits (e.g., 8 to 32 bits for all coded fragments 181, 182, 183, 184, 185, and 186) based on the maximum value that an overflow resulting from the numerical operations on numerical representation 162 can take.

In the same way, system 110 generates numerical representations 164, 166, and 168. In some embodiments, generating the numerical representations includes one or more of: a frequency domain representation of the data element and the mathematical operation that associates the frequency domain representation with a function of time (e.g., a Fourier transformation of the data element); and a computation of amplitude and phase of the data element. The system includes the padding bits in the corresponding data elements associated with numerical representations 164, 166, and 168. The system forms a data matrix 160 comprising numerical representations 162, 164, 166, and 168. In some embodiments, the system arranges the converted numerical representations 162, 164, 166, and 168, and corresponding padding bits into a matrix representation (i.e., data matrix 160) in system memory and/or processor cache registers. System 110 can also determine a generator matrix 176 based on the size of the data matrix and the number of coded fragments to be generated.

System 110 can combine additional security bits 171 with data matrix 160. System 110 may use an obfuscation matrix 174 to inject additional security bits 171. System 110 can use existing methods of encryption key management based on any industry standard to manage additional security bits 171. System 110 can also apply a number of obfuscation operations 173, which include a combination of shift and substitution operations and matrix operations, to data matrix 160. Obfuscation operations 173 can further reduce duplicate bitwise and linear arithmetic operations that may be needed to multiply data matrix 160 and generator matrix 176.

The system then multiplies data matrix 160 and generator matrix 176 to generate code word 190, which includes coded fragments 191, 192, 193, 194, 195, and 196. In some embodiments, the number of matrix elements in data matrix 160 can be determined by the dimension of generator matrix 176 such that data matrix 160 and generator matrix 176 can be multiplied. System 110 can also select generator matrix 176 in such a way that the overflow resulting from the multiplication is relatively small (i.e., can be represented by the padding bits/overflow bits, which are then summed and carried over to the next set of matrix multiplication). In some embodiments, the overflow is less than or equal to the maximum of the respective summation of each row of generator matrix 176. The summation can be the summation of the elements of a row, wherein the number of elements in a row is equal to the number of columns in generator matrix 176.

This calculation may further be utilized to determine the number of padding bits necessary to hold the final sum of data element 140 when multiplied to the generator matrix 160. The system then can allocate between one and four bytes as padding bits for overflow handling and data alignment purposes.

The multiplication between data matrix 160 and generator matrix 176 can include simple numerical operations, which are typically faster than linear arithmetic or table lookup operations used in Galois fields. Examples of numerical operations include, but are not limited to, addition, subtraction, multiplication, division, mix column, byte substitution, bit-shifting, and logical (AND, OR and XOR) operations. System 110 can reduce the number of these operations by applying obfuscation matrix 174 and obfuscation operations 173 to data matrix 160. In this way, system 110 can provide data obfuscation and erasure coding to data matrix 160 in an integrated way, thereby using fewer computing cycles, faster computation, and higher throughput for the storage systems.

It should be noted that a numerical representation can be more scalable. For example, Galois field operations are 8-bit operations while numerical representations can be 16, 32, 64, and 128 bits or more. As a result, numerical operation-based erasure coding results in higher speed and throughput. In addition, the system can use well-known techniques to optimize numerical operations associated with the matrix multiplication. Numerical operations can further benefit from hardware accelerations with vector instruction sets. If the computing system includes dedicated hardware support (e.g., Graphic Processing Units (GPUs)), the system can select numerical data type and operations that can utilize such hardware.

Integrated Obfuscation, Encoding, Decoding, and Recovery

Figure 2A:
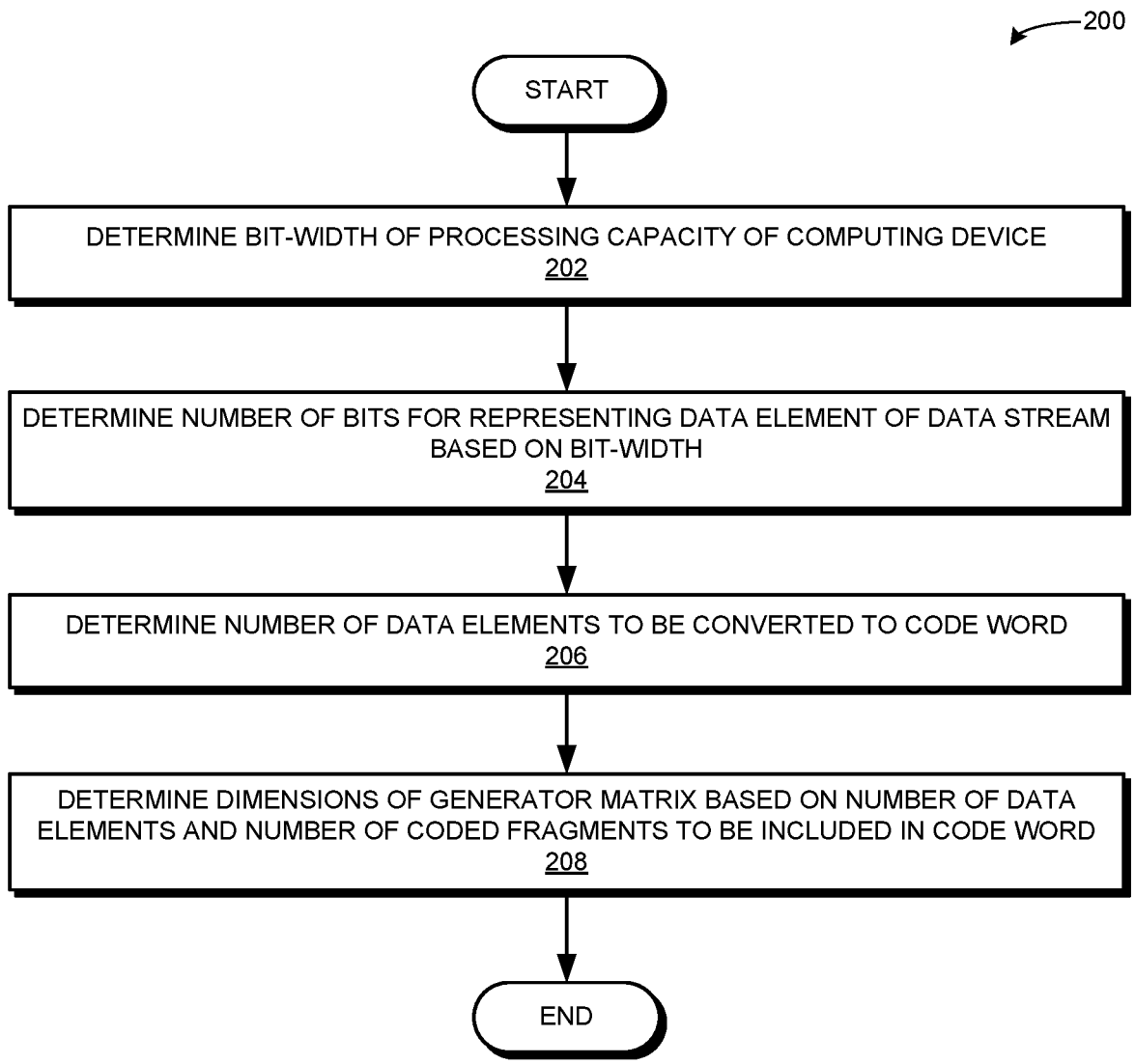
FIG. 2A presents a flowchart illustrating an initialization method for integrated security and numerical operation-based erasure coding, in accordance with an embodiment described herein.

FIG. 2A presents a flowchart 200 illustrating an initialization method for integrated security and numerical operation-based erasure coding, in accordance with an embodiment described herein. During operation, a storage management system determines the bit-width of the processing capacity of a computing device (operation 202). The system then determines a number of bits for representing a data element of the data stream based on the bit-width (operation 204). The system determines a number of data elements to be converted to a code word (operation 206) and determines dimensions of a generator matrix based on the number of data elements and the number of coded fragments to be included in a code word (operation 208).

Figure 2B:
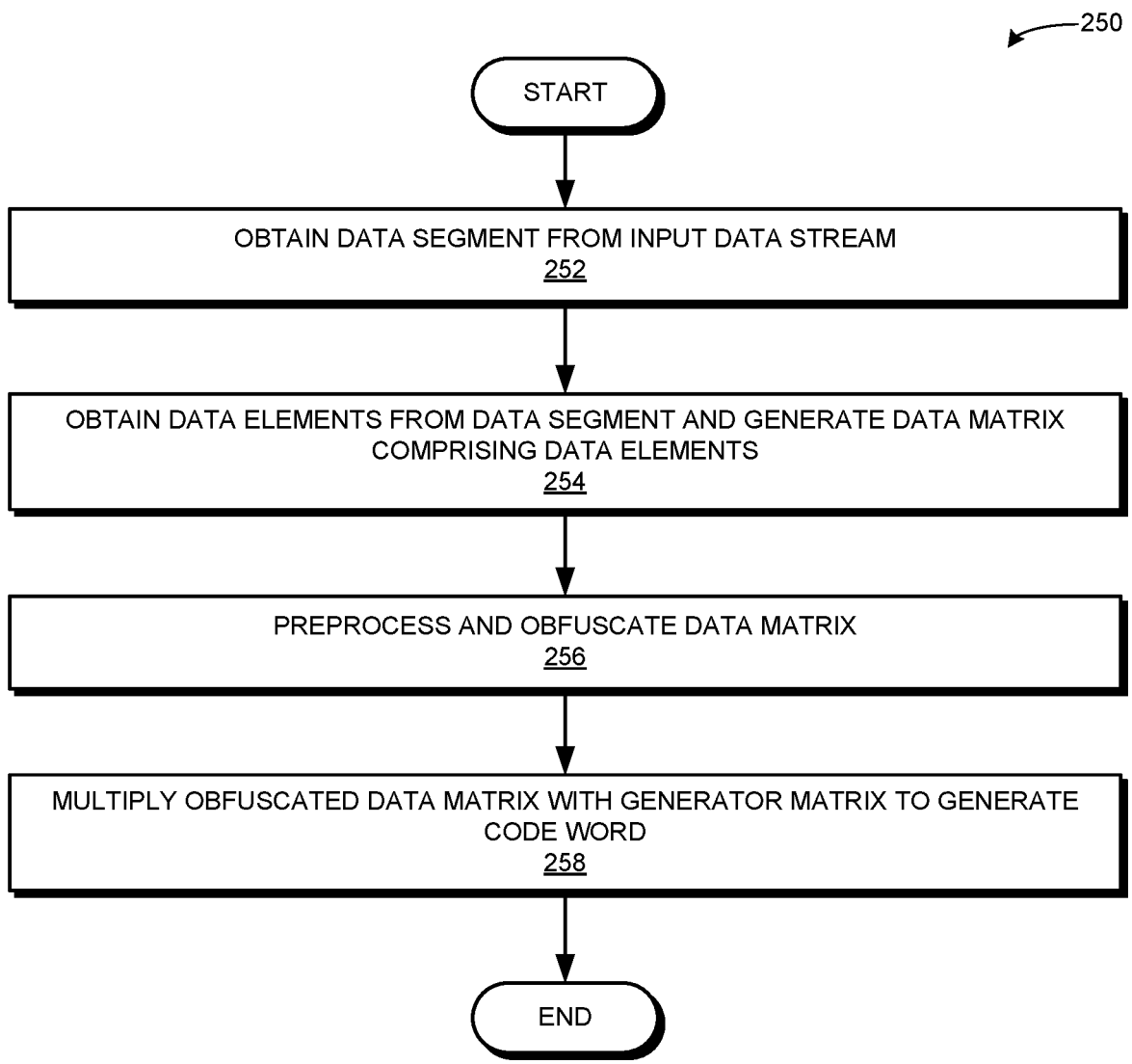
FIG. 2B presents a flowchart illustrating a method for facilitating integrated security and erasure-coding, in accordance with an embodiment described herein.

FIG. 2B presents a flowchart illustrating a method for facilitating integrated security and erasure-coding, in accordance with an embodiment described herein. During operation, a storage management system obtains a data segment from an input data stream (operation 252). The system obtains a number of data elements from the data segment and generates a data matrix comprising the data elements (operation 254). The system then preprocesses and obfuscates the data matrix (operation 256) and multiplies the obfuscated data matrix with the generator matrix to generate a code word (operation 258).

Figure 3A:
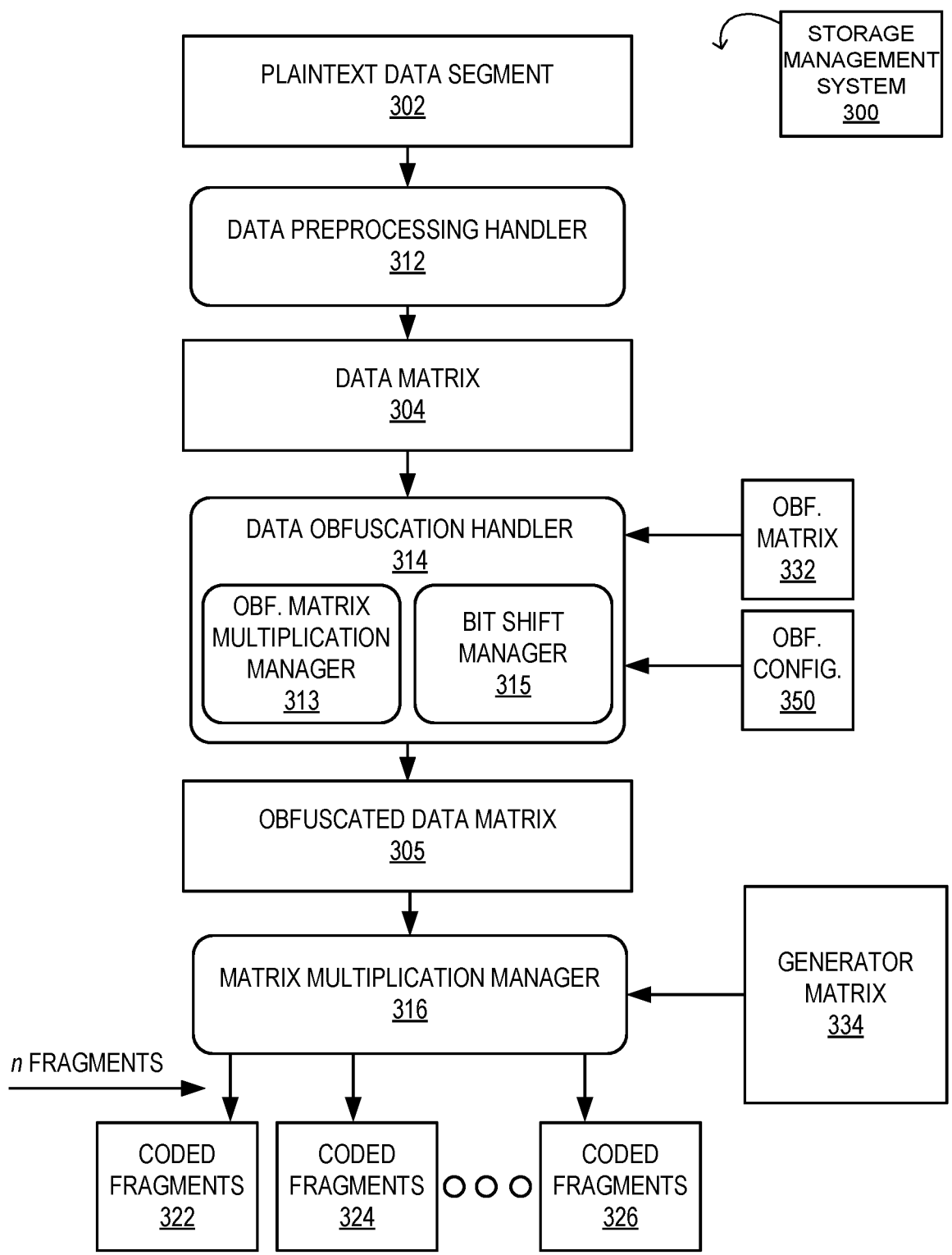
FIG. 3A illustrates an exemplary encoding process for integrated security and numerical operation-based erasure coding, in accordance with an embodiment described herein.

FIG. 3A illustrates an exemplary encoding process for integrated security and numerical operation-based erasure coding, in accordance with an embodiment described herein. During operation, a storage management system 300 obtains plaintext data segment 302 from a data stream. A data pre-processing handler 312 of the system converts the data into a data matrix, as described in conjunction with FIG. 1C. In some embodiments, handler 312 converts the input plaintext data segment 302 into numerical representation, which can include real numbers, imaginary numbers, a combination of real and imaginary numbers, or linear equations, such as Galois field equations. Handler 312 can then determine and allocate the optimal number of padding bits to be used in the coded fragment, 322, 324, . . . , 326, and arranges the numerical representations and corresponding padding bits in a data matrix 304. System 300 can also determine a generator matrix 334 based on the data size for generating the corresponding coded fragments.

System 300 can further include a data obfuscation handler 314, which obfuscates data matrix 304 for providing data security. Handler 314 includes an obfuscation matrix multiplication manager 313 and a bit shift manager 315. During operation, bit shift manager 315 organizes data matrix 304 with shifts and substitutions such that data matrix 304 becomes obfuscated. Bit shift manager 315 can obtain an obfuscation configuration 350, which indicates how the bit shift and/or substitution operations are executed (e.g., a bit shift configuration). Obfuscation configuration 350 can be generated by handler 314 based on the sizes of data matrix 304 and the operations of generator matrix 334. It should be noted that obfuscation configuration 350 can be predetermined by the user. Handler 314 can also incorporate matrix operations into data matrix 304 for further elimination of duplicate bitwise and linear arithmetic operations associated with the erasure coding process.

In some embodiments, handler 314 analyzes generator matrix 334 to determine a set of bit shift and substitution operations that can be in the subsequent matrix operations (e.g., in matrix multiplication between data matrix 304 and generator matrix 334). Handler 314 then selects the operations that can also be used for data obfuscation. Based on the analysis and selection, handler 314 can generate obfuscation configuration 350 such that a plurality of the shift and substitution operations in the subsequent matrix operation can be reduced. Obfuscation configuration 350 can include shift and substitution operations associated with single or multiple bytes, or single or multiple rows and/or columns of data matrix 304.

In some embodiments, obfuscation matrix multiplication manager 313 combines additional security bits with data matrix 304. The additional data bits can include, and are not limited to, encryption keys defined by the user or generated by system 300. System 300 can use industry standard methods of encryption key management for encryption keys. System 300 can generate an obfuscation matrix 332 to inject the additional security bits by multiplying obfuscation matrix 332 with data matrix 304, which may already include the shift and substitution operations. This multiplication can be an Exclusive OR (XOR) operation between obfuscation matrix 332 and data matrix 304. As a result, obfuscation matrix multiplication manager 313 can incorporate the security bits into data matrix 304 using a bit-level operation without relying on computationally extensive matrix multiplications.

System 300 can determine obfuscation matrix 332 in such a way that obfuscation matrix 332 shares common properties with generator matrix 334. These shared matrix properties can reduce duplicate matrix operations associated with obfuscation matrix 332 and generator matrix 334. It should be noted that obfuscation matrix 332 can be predetermined by the user. Obfuscation matrix 332 may include elements from Galois field lookup tables, which are commonly used in AES encryption implementations and erasure coding, and other binary matrices. In this way, handler 314 generates obfuscated data matrix 305 using obfuscation matrix 332 and obfuscation configuration 350.

In some embodiments, system 300 can generate generator matrix 334 deterministically based on a set of criteria, which include and are not limited to, the size of data matrix 304, the number of coded fragments to be generated (e.g., in the example in FIG. 3A, this number is n), a threshold for fault tolerance, and availability of a sparse inverse of a respective sub-matrix required for recovery and reconstruction. Generator matrix 334 can be preselected by a user of the system (e.g., an administrator) such that the above criteria are met. Generator matrix 334 can include elements from Galois field lookup tables, and real and/or imaginary numbers, with low numerical values to limit the overflow. In some embodiments, generator matrix 334 is designed in such a way that a multiplication between data matrix 304 and generator matrix 334 only requires additions, subtractions, byte substitution, and bit shift operations.

A matrix multiplication manager 316 multiplies obfuscated data matrix 305 and generator matrix 334 to generate n coded fragments, which includes coded fragments 322, 324, and 326. In some embodiments, such erasure encoding includes operations over non-finite field arithmetic. The multiplication process includes multiplication between real numbers, imaginary numbers, or real and imaginary numbers. In some embodiments, an element in obfuscated data matrix 305 or generator matrix 334 can be represented as a highly vectorized data structure. This allows high degrees of loop level parallelism (LLP) during the multiplication process. For example, multiple operations with matrix elements represented in highly vectorized data structures can be performed simultaneously. A computer processor usually can execute an instruction, which processes several operations simultaneously.

Furthermore, as described in conjunction with FIG. 1C, a respective data element of data matrix 304 is determined based on the bit-width of the processing capability (e.g., width of the bus) of a computing device. As a result, such simultaneous processing of the elements can occur over a wide data path (e.g., 64-bit, 128-bit, etc.). As a result, the matrix multiplication process can simultaneously process more data bits, leading to improved efficiency. Selection of the width of the data path and the size of a vectorized element may depend on the size of the data matrix and the generator matrix, operations associated with the matrix multiplication, etc.

Figure 3B:
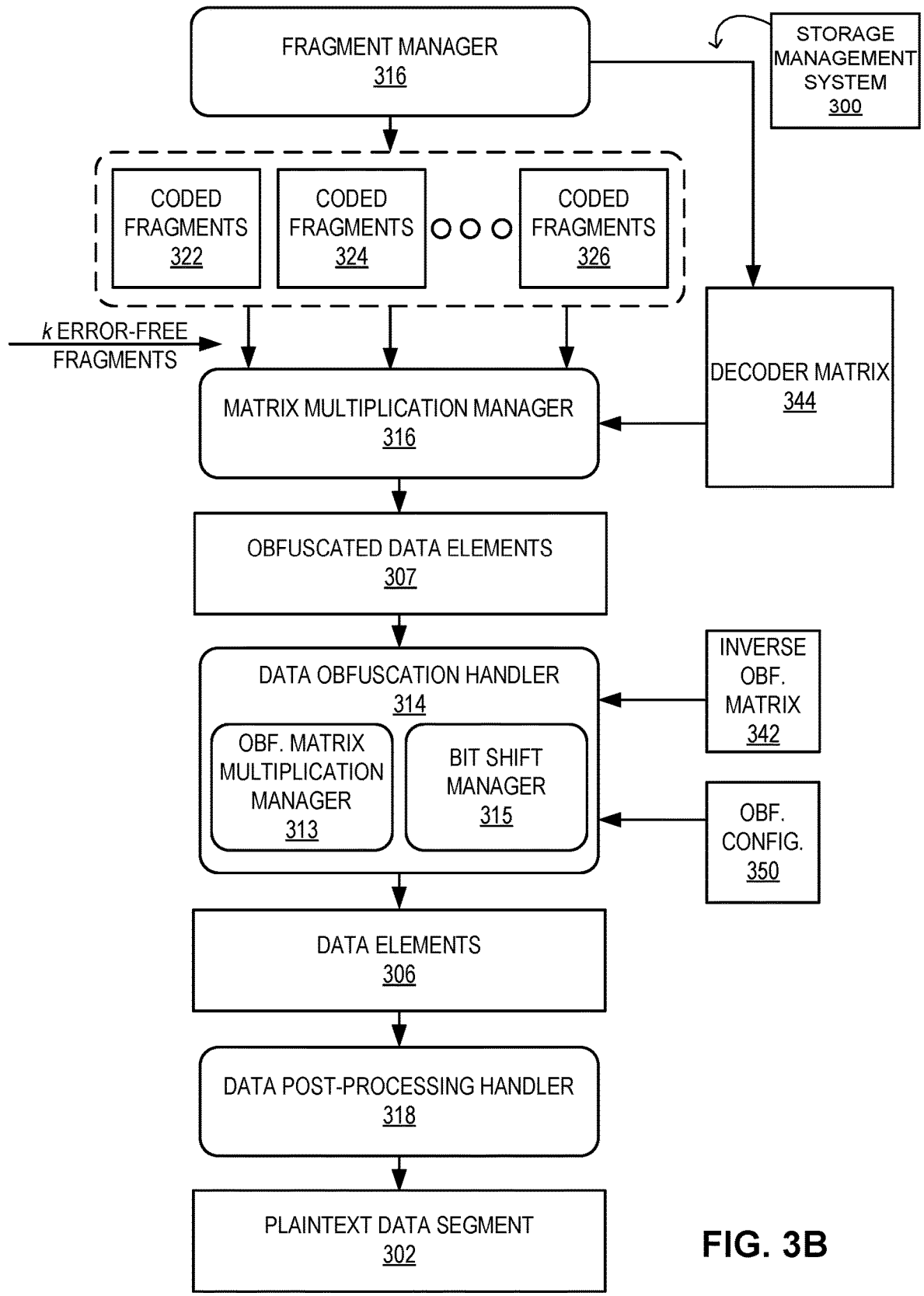
FIG. 3B illustrates an exemplary decoding process for integrated security and numerical operation-based erasure coding, in accordance with an embodiment described herein.

FIG. 3B illustrates an exemplary decoding process for integrated security and numerical operation-based erasure coding, in accordance with an embodiment described herein. During operation, a fragment manager 316 of storage management system 300 determines the minimum number of error-free coded fragments needed to retrieve the data elements. Suppose that the number of coded fragments is n and the minimum number of coded fragments needed to retrieve the data is k (wherein n>k). Fragment manager 316 then selects k error-free coded fragments from the n coded fragments. In the example in FIG. 3B, the n coded fragments include coded fragments 322, 324, and 326. Criteria for selecting the k error-free coded fragments from the n coded fragments include, but are not limited to, one or more of: first available error-free fragments, data location, storage and network transfer speed, and system load. The key benefit of selecting from the first K error-free coded fragments is the reduction of the latency associated with data access.

Fragment manager 316 also determines an appropriate decoder matrix 344. Matrix elements of decoder matrix 344 can be real numbers and/or elements from Galois field lookup tables. The matrix elements can also be fractions without repeating decimals that may cause rounding errors. Decoder matrix 344 can be fixed for generator matrix 334 and the selected k coded fragments. For different k coded fragments, the corresponding decoder matrix can be precalculated from generator matrix 334. When needed, fragment manager 316 can retrieve the decoder matrix corresponding to the selected k coded fragments. In some embodiments, decoder matrix 344 can use a uniform scalar numerical data, which can be calculated by the determinant of generator matrix 334, to eliminate any calculation that may otherwise result in a floating point number. Decoder matrix 344 can be preselected by the user or generated by fragment manager 316.

Matrix multiplication manager 314 multiplies the selected k coded fragments, which can be represented as a coded matrix, with decoder matrix 344 to generate obfuscated data elements 307. Bit shift manager 315 obtains obfuscation configuration 350. Using obfuscation configuration 350, bit shift manager 315 determines how the bit shift and/or substitution operations have been executed to obfuscate plaintext data segment 302. Bit shift manager 315 then reverses bit shift and/or substitution operations in obfuscated data elements 307. Obfuscation matrix multiplication manager 313 may remove the additional security bits from obfuscated data elements 307. System 300 can generate an inverse obfuscation matrix 342, which can be an inverse matrix of obfuscation matrix 332, to remove the additional security bits. Obfuscation matrix multiplication manager 313 can remove the additional security bits by multiplying inverse obfuscation matrix 342 with obfuscated data elements 307, from which the shift and substitution operations may have already been applied. In this way, handler 314 removes the obfuscation from obfuscated data elements 307 to obtain data elements 306.

Data elements 306 can include elements from Galois field lookup tables and/or numerical representation of the original data segment and additional padding bits. A data post-processing handler 318 of the system then removes the padding bits from data elements 306, if any, and converts the numerical representations into plaintext data segment 302.

Figure 3C:
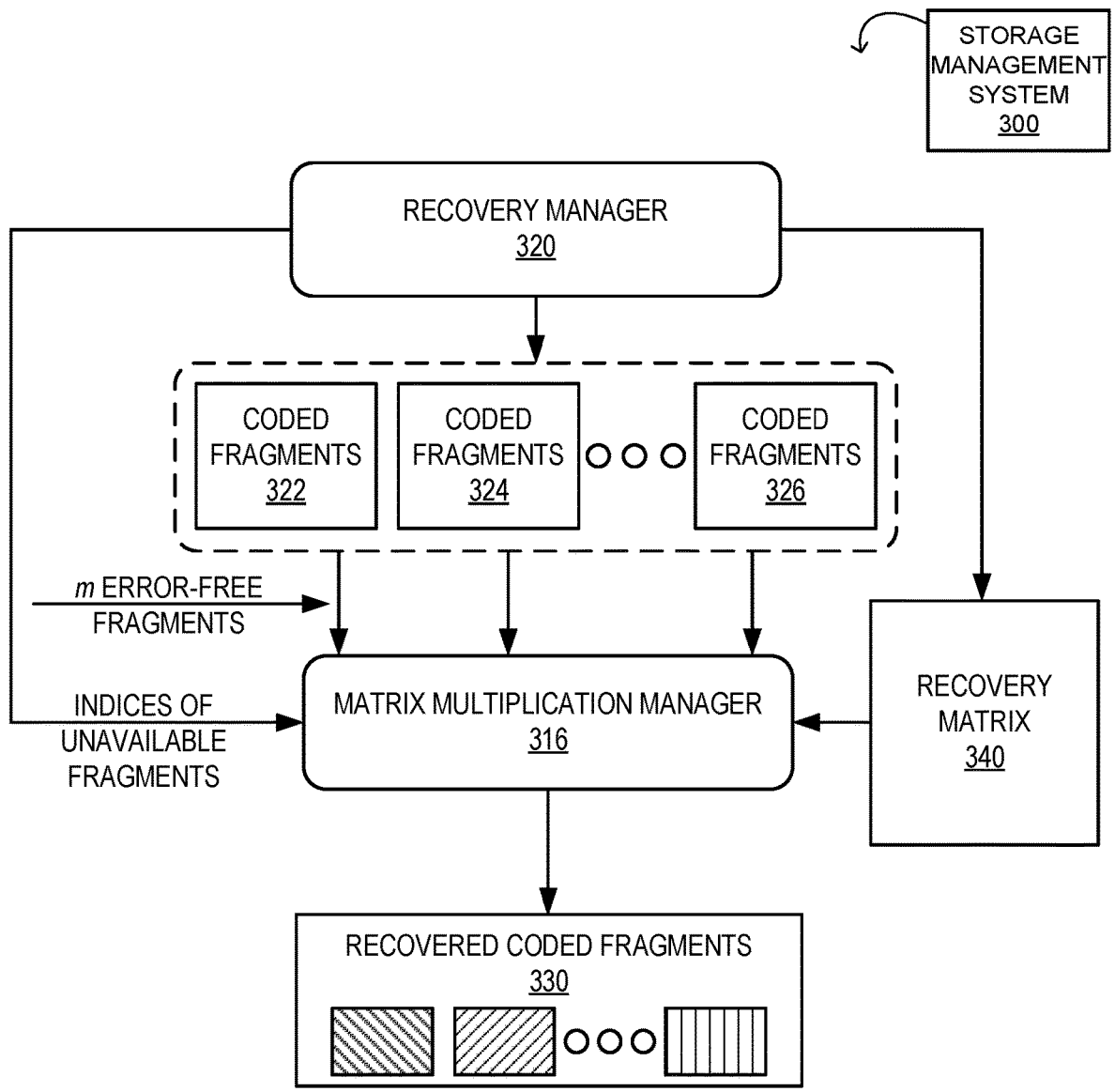
FIG. 3C illustrates an exemplary recovery process for integrated security and numerical operation-based erasure coding, in accordance with an embodiment described herein.

FIG. 3C illustrates an exemplary recovery process for integrated security and numerical operation-based erasure coding, in accordance with an embodiment described herein. This recovery process is based on numerical representation-based erasure coding. During operation, a recovery manager 320 of a storage management system determines that one or more of the n coded fragments are unavailable. Recovery manager 320 can use well-known methods of integrity checks in a distributed storage system (e.g., a hash-based verification technique). Recovery manager 320 then determines the minimum number of error-free coded fragments needed to recover the unavailable coded fragments. In the example in FIG. 3C, the minimum number is m. Recovery manager 320 selects m coded fragments from the remaining coded fragments needed to recreate the unavailable coded fragments.

Recovery manager 320 obtains a recovery matrix 340 by inverting a sub-matrix, which corresponds to the selected m coded fragments, of generator matrix 334. Matrix multiplication manager 316 then multiplies the selected m coded fragments and recovery matrix 340 to reconstruct the recovered coded fragments 330. Matrix multiplication manager 316 uses the indices of the unavailable coded fragments to determine which of the recovered coded fragments are the unavailable coded fragments. It should be noted that this matrix multiplication can recover all unavailable coded fragments. In this way, the embodiments of the present invention can avoid a repeated recovery process for individual unavailable coded fragments.

Operations

Figure 4A:
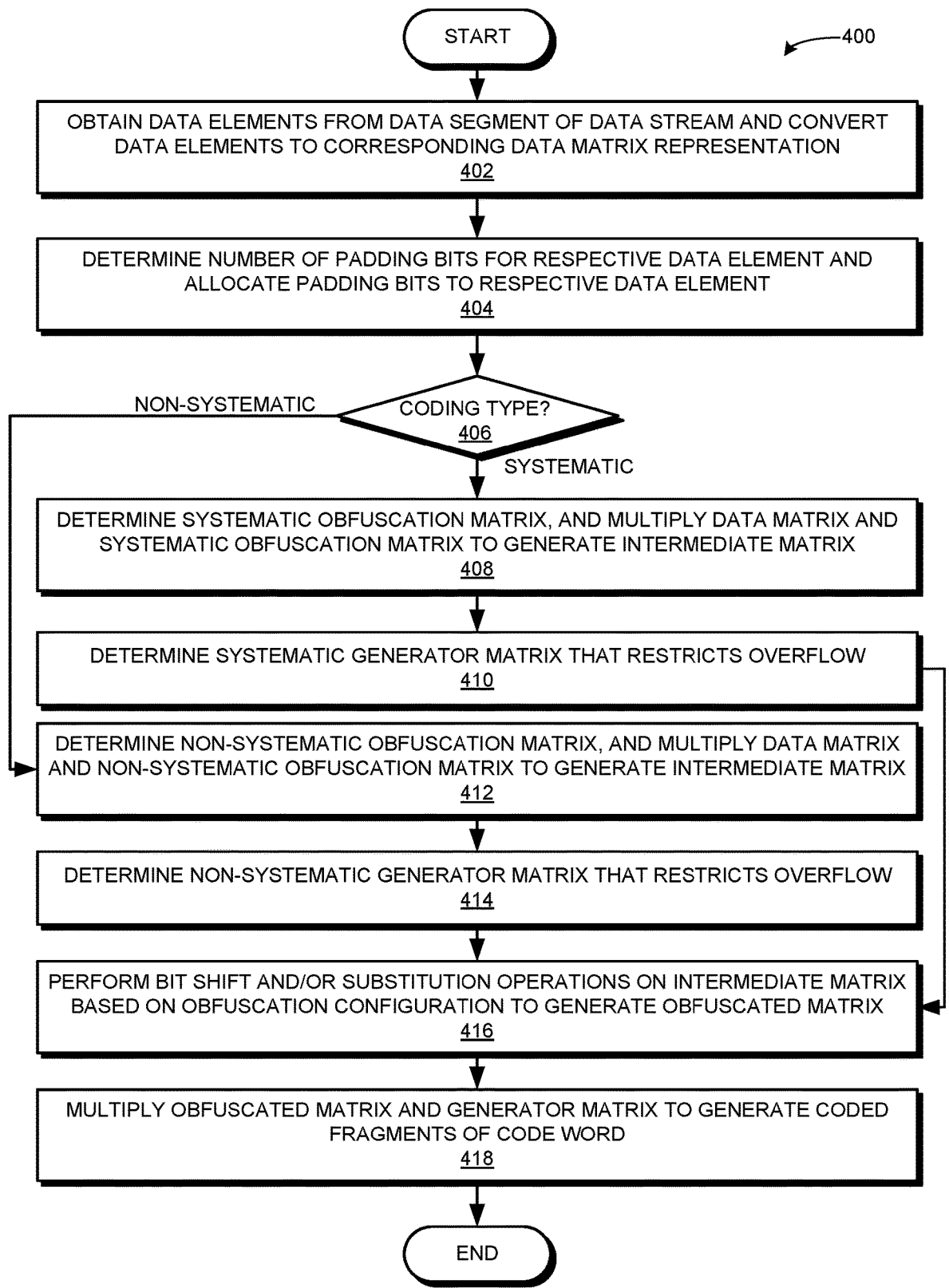
FIG. 4A presents a flowchart illustrating an encoding method for integrated security and numerical operation-based erasure coding, in accordance with an embodiment described herein.

FIG. 4A presents a flowchart 400 illustrating a method for encoding data elements using numerical operation-based erasure coding, in accordance with an embodiment of the present invention. During operation, a storage management system obtains data elements from a data segment of a data stream and converts the data elements to a corresponding data matrix representation (operation 402). The bytes in the data matrix can represent numerical representations, such as integer and floating point, or linear equations, such as Galois field equations. The system then determines the number of padding bits for a respective data element and allocates padding bits to a respective data element (operation 404). The system checks a coding type for erasure coding (operation 406). If the coding type is systematic erasure coding, the system determines a systematic obfuscation matrix, and multiplies the data matrix with the obfuscation matrix to generate an intermediate matrix (operation 408). The system then determines a systemic generator matrix that restricts overflow (e.g., to the allocated bits) (operation 410). If the coding type is non-systematic erasure coding, the system determines a non-systematic obfuscation matrix, and multiplies the data matrix with the obfuscation matrix to generate an intermediate matrix (operation 412). The system then determines a non-systematic generator matrix that restricts overflow (e.g., to the allocated bits) (operation 414).

Upon determining the generator matrix (operation 410 or 414), the system performs bit shift and/or substitution operations on the intermediate matrix based on an obfuscation configuration to generate an obfuscated matrix (operation 416). It should be noted that the system can also perform the bit shift and/or substitution operations prior to the multiplication of the obfuscation matrix. For example, the system can perform the bit shift and/or substitution operations on the data matrix to generate an intermediate matrix, and then multiply the intermediate matrix with the obfuscation matrix to generate an obfuscated matrix. Upon generating the obfuscated matrix, the system multiplies the obfuscated matrix and the generator matrix to generate coded fragments of the code word (operation 418).

Figure 4B:
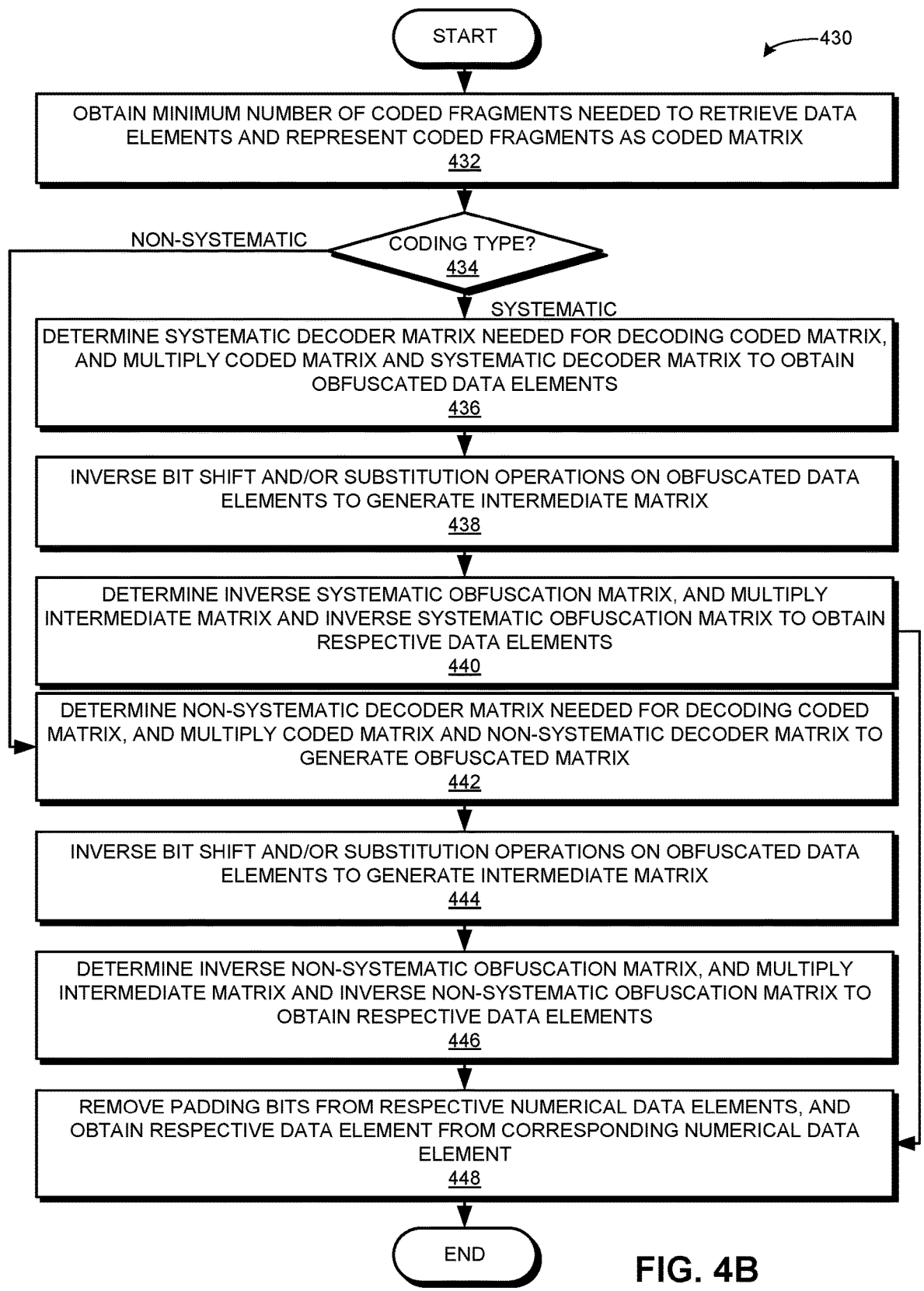
FIG. 4B presents a flowchart illustrating a decoding method for integrated security and numerical operation-based erasure coding, in accordance with an embodiment described herein.

FIG. 4B presents a flowchart 430 illustrating a method for decoding coded fragments using numerical operation-based erasure coding, in accordance with an embodiment of the present invention. During operation, a storage management system obtains the minimum number of coded fragments needed to retrieve the data elements and represents the coded fragments as a coded matrix (operation 432). The system checks a coding type for the erasure coding (operation 434). If the coding type is systematic erasure coding, to decode encoded fragments, the system determines a systematic decoder matrix needed for decoding the coded matrix, and multiplies the coded matrix and decoder matrix to obtain the obfuscated data elements (operation 436).

The system performs inverse bit shift and/or substitution operations on the obfuscated data elements (e.g., using the obfuscation configuration) to generate an intermediate matrix (operation 438). The system then determines an inverse systemic obfuscation matrix, and multiplies the intermediate matrix and the inverse systemic obfuscation matrix to obtain respective data elements (operation 440). On the other hand, if the coding type is non-systematic erasure coding, the system determines a non-systematic decoder matrix needed for decoding the coded matrix, and multiplies the coded matrix and decoder matrix to obtain the obfuscated data elements (operation 442). The system performs inverse bit shift and/or substitution operations on the obfuscated data elements to generate an intermediate matrix (operation 444). In some embodiments, for non-systematic erasure coding, the data fragments can be concatenated to obtain the obfuscated data elements.

The system then determines an inverse non-systemic obfuscation matrix, and multiplies the intermediate matrix and the inverse non-systemic obfuscation matrix to obtain respective data elements (operation 446). It should be noted that the system can also reverse the bit shift and/or substitution operations prior to the multiplication of the inverse obfuscation matrix. If the data elements are in corresponding numerical representation, the obtained data elements can be referred to as numerical data elements. The system then can remove the padding bits from a respective numerical data element and obtain a respective data element from corresponding numerical data element (e.g., the corresponding numerical representation) (operation 448).

Figure 4C:
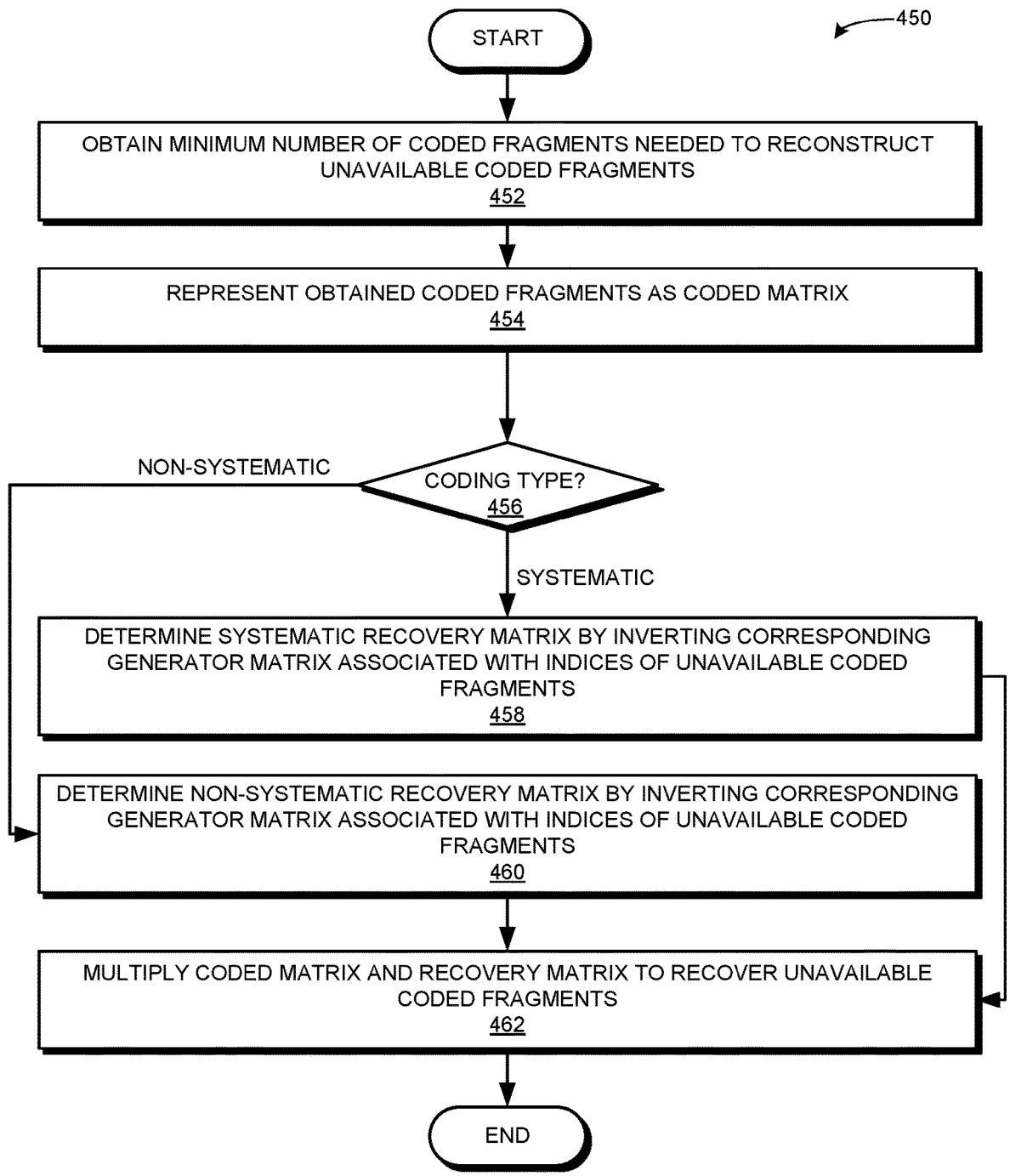
FIG. 4C presents a flowchart illustrating a recovery method for integrated security and numerical operation-based erasure coding, in accordance with an embodiment described herein.

FIG. 4C presents a flowchart 450 illustrating a method for recovering corrupted coded fragments using numerical operation-based erasure coding, in accordance with an embodiment of the present invention. This recovery process is based on numerical representation-based erasure coding. During operation, a storage management system obtains a minimum number of coded fragments needed to reconstruct unavailable coded fragments (operation 452) and represents the obtained coded fragments as a coded matrix (operation 454). The system checks a coding type (operation 456). If the coding type is systematic erasure coding, the system determines a systematic recovery matrix by inverting a corresponding generator matrix associated with indices of unavailable coded fragments (operation 458). If the coding type is non-systematic erasure coding, the system determines a non-systematic recovery matrix by inverting a corresponding generator matrix associated with indices of unavailable coded fragments (operation 460). The system multiplies the coded matrix and the recovery matrix to recover unavailable coded fragments (operation 462).

Figure 5:
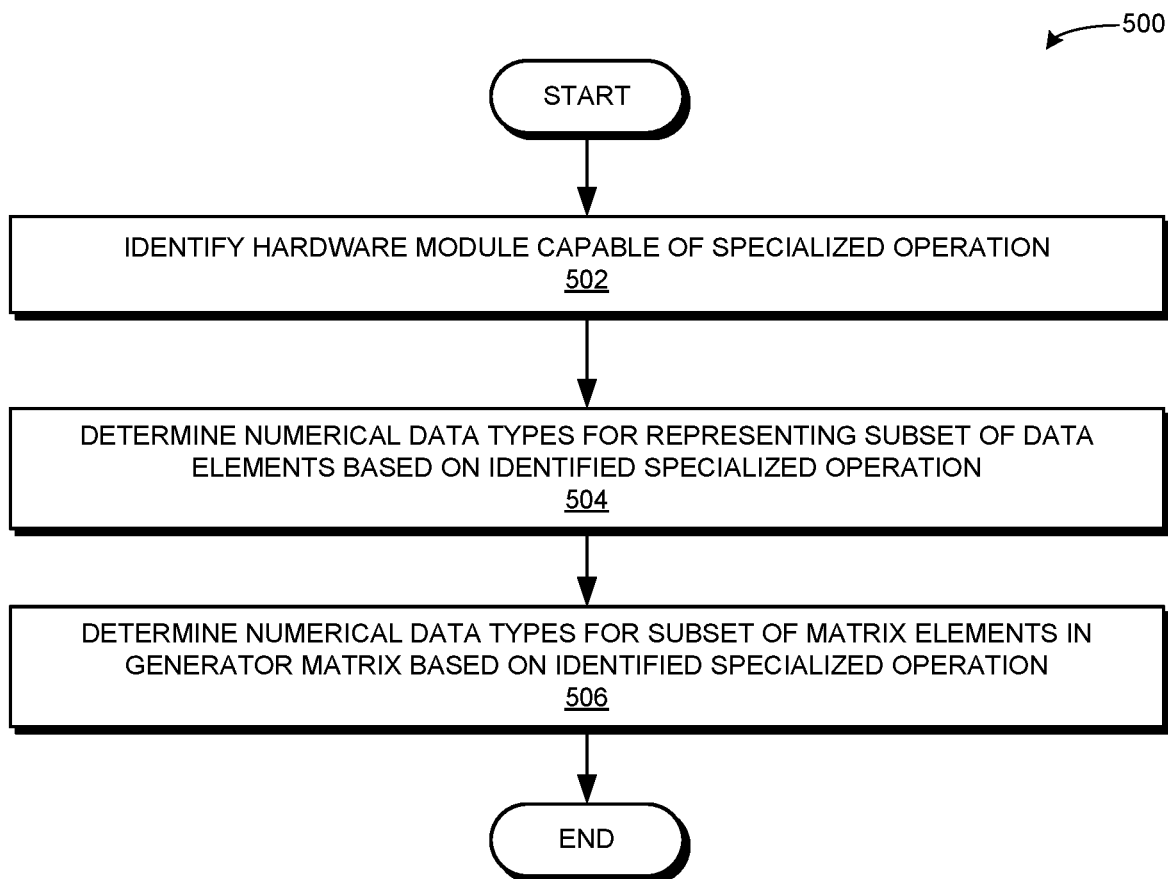
FIG. 5 presents a flowchart illustrating a method for determining numerical data types for integrated security and numerical operation-based erasure coding, in accordance with an embodiment described herein.

FIG. 5 presents a flowchart 500 illustrating a method for determining numerical data types for numerical operation-based erasure coding, in accordance with an embodiment of the present invention. During operation, a storage management system identifies one or more hardware modules capable of a specialized operation (operation 502). The system determines numerical data types for representing a subset of the data elements based on the identified specialized operation (operation 504). Similarly, the system determines numerical data types for representing a subset of matrix elements of the generator matrix based on the identified specialized operation (operation 506). For example, if a computing system includes a GPU, the system identifies the GPU and its capability of processing a floating point. The system then determines the floating point as the numerical data type for representing the data elements and the matrix elements. In some embodiments, the system may use floating points for numeric calculation but store the final result as integers to ensure decoding compatibility across all platforms.

Exemplary Computer and Communication System

Figure 6:
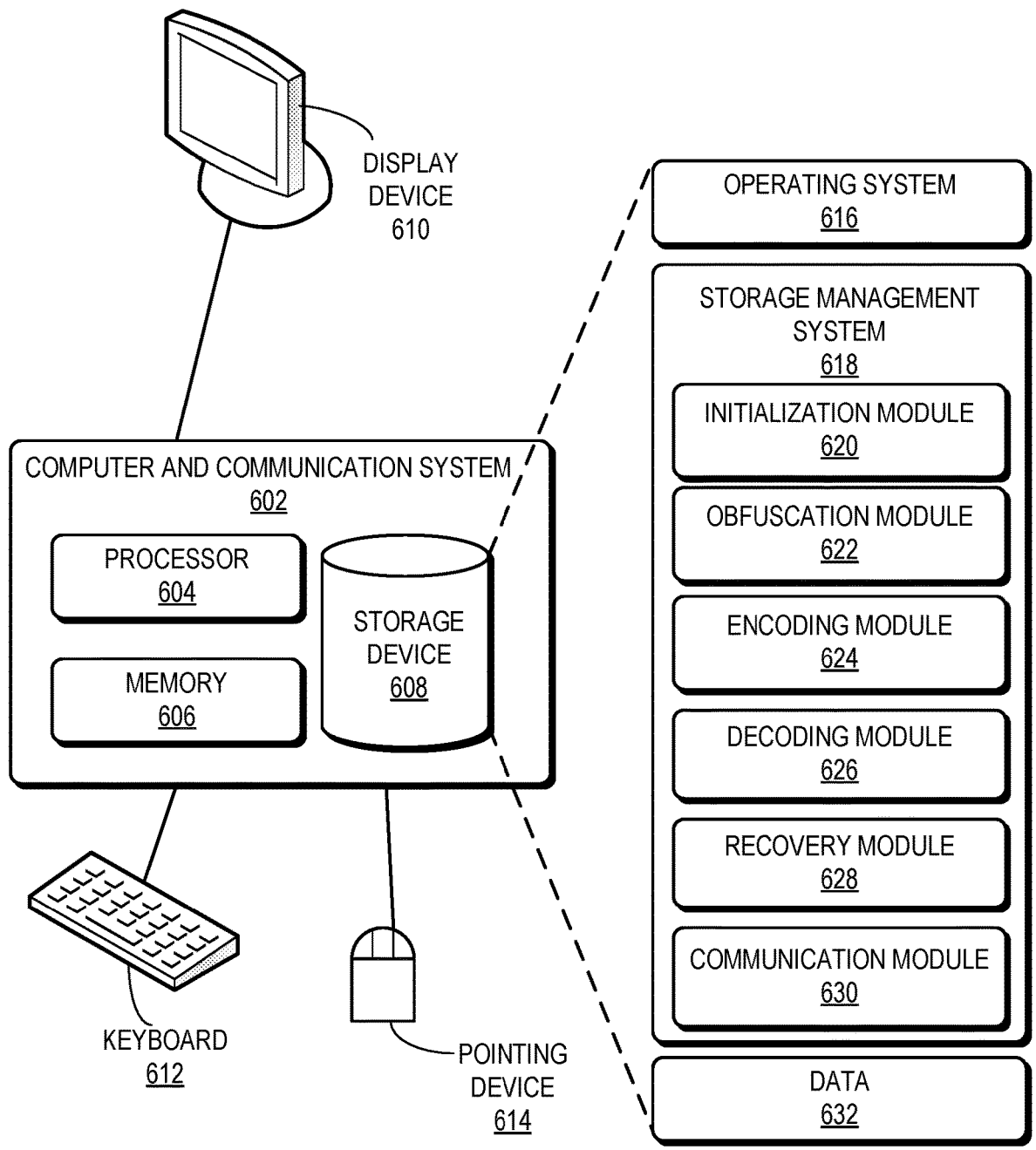
FIG. 6 illustrates an exemplary computer and communication system that facilitates integrated security and numerical operation-based erasure coding, in accordance with an embodiment described herein.

FIG. 6 illustrates an exemplary computer and communication system that facilitates integrated security and numerical operation-based erasure coding, in accordance with an embodiment described herein. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a storage management system 618, and data 632.

Storage management system 618 can include instructions, which when executed by computer and communication system 602, can cause computer and communication system 602 to perform the methods and/or processes described in this disclosure. Storage management system 618 includes instructions for determining a number of bits for representing a data element of the data stream based on the bit-width of computer and communication system 602 (initialization module 620). Storage management system 618 also includes instructions for determining dimensions of a generator matrix based on the number of data elements and the number of coded fragments to be included in a code word (initialization module 620). In addition, storage management system 618 also includes instructions for determining a data matrix from a data segment (e.g., using numerical representation or Galois field arithmetic) (initialization module 620).

Furthermore, storage management system 618 includes instructions for determining an obfuscation matrix and/or an obfuscation configuration (obfuscation module 622). Storage management system 618 also includes instructions for incorporating security bits into the data matrix using the obfuscation matrix, and/or performing shift and/or substitution operations for obfuscating the data matrix based on the obfuscation configuration (obfuscation module 622). Storage management system 618 further includes instructions for encoding data elements to generate coded fragments (e.g., using Galois field-based or numerical operation-based erasure coding) (encoding module 624).

Storage management system 618 further includes instructions for decoding coded fragments to obtain data elements (e.g., using Galois field-based or numerical operation-based erasure coding) (decoding module 626). Storage management system 618 further includes instructions for recovering unavailable coded fragments (e.g., using numerical operation-based erasure coding) (recovery module 628). Storage management system 618 can also include instructions for exchanging information with other devices, such as distributed storage devices (communication module 630). Data 632 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating integrated security and high availability, the method comprising:
    obtaining, by a computing system, a number of data elements based on a number of coded fragments that a code word of erasure encoding includes;
    determining one or more bit-level operations for the data elements in such a way that at least one of the one or more bit-level operations becomes eliminated from a first set of operations of the erasure encoding;
    obfuscating the data elements based on the one or more bit-level operations; and
    generating the code word of the erasure encoding from the obfuscated data elements based on a generator matrix, wherein the generator matrix indicates a second set of operations derived from eliminating the at least one operation from the first set of operations.

2. The method of claim 1, wherein the number of data elements comprises a first data element and a second data element, wherein the first data element comprises a first set of bytes from a first data stream, and wherein the second data element comprises a second set of bytes from the first data stream.

3. The method of claim 1, wherein the number of data elements comprises a first data element and a second data element, wherein the first data element comprises a set of bytes from a first data stream, and wherein the second data element comprises a second set of bytes from a second data stream.

4. The method of claim 1, wherein the one or more bit-level operations include one or more of: a bit shift operation, an exclusive OR (XOR) operation, and a replacement operation.

5. The method of claim 4, wherein the XOR operation is between the data elements and a binary obfuscation matrix, wherein the binary obfuscation matrix is organized to incorporate security bits into the data elements.

6. The method of claim 4, further comprising determining an obfuscation configuration, which specifies the bit shift operation and the replacement operations.

7. The method of claim 1, wherein the data elements are represented in a numerical representation, wherein the numerical representation and the generator matrix include one or more complex numbers in a format composed of real and imaginary parts.

8. The method of claim 1, wherein determining the one or more bit-level operations comprises:
    determining a set of bit-level operations that share common properties with the obfuscation and the erasure encoding; and
    selecting the one or more bit-level operations from the set of bit-level operations.

9. The method of claim 1, further comprising:
    retrieving a minimum number of coded fragments of the code word needed to recover the data elements;
    applying an inverse of the one or more bit-level operations to the coded fragments to remove the obfuscation; and
    obtaining the data elements from the coded fragments based on an inverted matrix of a sub-matrix of the generator matrix based on the minimum number of the coded fragments.

10. The method of claim 1, further comprising:
    identifying one or more of the coded fragments that are unavailable;
    identifying remaining coded fragments that are available;
    determining a sub-matrix of the generator matrix based on a minimum number of the remaining coded fragments needed to recover the unavailable coded fragments; and
    recovering, at the same time, all of the unavailable coded fragments based on an inverted matrix of the sub-matrix and indices of the unavailable coded fragments, thereby avoiding recovery of one unavailable coded fragment at a time.

11. A non-transitory computer-readable storage medium storing instructions that when executed by a computer cause the computer to perform a method for facilitating integrated security and high availability, the method comprising:
    obtaining, by a computing system, a number of data elements from a data stream based on a number of coded fragments that a code word of erasure encoding includes;
    determining one or more bit-level operations for the data elements in such a way that at least one of the one or more bit-level operations becomes eliminated from a first set of operations process of the erasure encoding;
    obfuscating the data elements based on the one or more bit-level operations; and
    generating the code word of the erasure encoding from the obfuscated data elements based on a generator matrix, wherein the generator matrix indicates a second set of operations derived from eliminating the at least one operation from the first set of operations.

12. The computer-readable storage medium of claim 11, wherein the number of data elements comprises a first data element and a second data element, wherein the first data element comprises a first set of bytes from a first data stream, and wherein the second data element comprises a second set of bytes from the first data stream.

13. The computer-readable storage medium of claim 11, wherein the number of data elements comprises a first data element and a second data element, wherein the first data element comprises a set of bytes from a first data stream, and wherein the second data element comprises a second set of bytes from a second data stream.

14. The computer-readable storage medium of claim 11, wherein the one or more bit-level operations include one or more of: a bit shift operation, an exclusive OR (XOR) operation, and a replacement operation.

15. The computer-readable storage medium of claim 14, wherein the XOR operation is between the data elements and a binary obfuscation matrix, wherein the binary obfuscation matrix is organized to incorporate security bits into the data elements.

16. The computer-readable storage medium of claim 14, wherein the method further comprises determining an obfuscation configuration, which specifies the bit shift operation and the replacement operations.

17. The computer-readable storage medium of claim 11, wherein the data elements are represented in a numerical representation, wherein the numerical representation and the generator matrix include one or more complex numbers in a format composed of real and imaginary parts.

18. The computer-readable storage medium of claim 11, wherein determining the one or more bit-level operations comprises:
  determining a set of bit-level operations that share common properties with the obfuscation and the erasure encoding; and
  selecting the one or more bit-level operations from the set of bit-level operations.

19. The computer-readable storage medium of claim 11, wherein the method further comprises:
  retrieving a minimum number of coded fragments of the code word needed to recover the data elements;
  applying an inverse of the one or more bit-level operations to the coded fragments to remove the obfuscation; and
  obtaining the data elements from the coded fragments based on an inverted matrix of a sub-matrix of the generator matrix based on the minimum number of the coded fragments.

20. The computer-readable storage medium of claim 11, wherein the method further comprises:
  identifying one or more of the coded fragments that are unavailable;
  identifying remaining coded fragments that are available;
  determining a sub-matrix of the generator matrix based on a minimum number of the remaining coded fragments needed to recover the unavailable coded fragments; and
  recovering, at the same time, all of the unavailable coded fragments based on an inverted matrix of the sub-matrix and indices of the unavailable coded fragments, thereby avoiding recovery of one unavailable coded fragment at a time.

* * * * *